United States Patent
Song et al.

(10) Patent No.: US 8,530,103 B2
(45) Date of Patent: Sep. 10, 2013

(54) FUEL CELL SYSTEM AND CONTROL METHOD THEREOF

(75) Inventors: Dong Song, Yokohama (JP); Masaharu Hatano, Yokohama (JP); Keiko Kushibiki, Fujisawa (JP); Kazufumi Takeuchi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 261 days.

(21) Appl. No.: 12/595,175

(22) PCT Filed: May 26, 2008

(86) PCT No.: PCT/JP2008/001305
§ 371 (c)(1),
(2), (4) Date: Oct. 8, 2009

(87) PCT Pub. No.: WO2008/149504
PCT Pub. Date: Dec. 11, 2008

(65) Prior Publication Data
US 2010/0119888 A1    May 13, 2010

(30) Foreign Application Priority Data
May 29, 2007  (JP) ................................ 2007-141986

(51) Int. Cl.
H01M 8/06    (2006.01)
(52) U.S. Cl.
USPC .......................................... 429/425; 429/408

(58) Field of Classification Search
USPC ................................................... 429/425, 444
See application file for complete search history.

(56) References Cited

U.S. PATENT DOCUMENTS

| | | | |
|---|---|---|---|
| 6,214,485 B1 | 4/2001 | Barnett et al. | |
| 2001/0029231 A1* | 10/2001 | Gorte et al. | 502/101 |
| 2002/0031690 A1* | 3/2002 | Shimazu et al. | 429/19 |
| 2003/0224230 A1* | 12/2003 | Stocker | 429/22 |
| 2005/0003244 A1* | 1/2005 | Pham | 429/12 |
| 2007/0092773 A1* | 4/2007 | Guo et al. | 429/24 |

FOREIGN PATENT DOCUMENTS

| | | |
|---|---|---|
| JP | 9-202602 A | 8/1997 |
| JP | 2000-268832 A | 9/2000 |
| JP | 2003-086225 A | 3/2003 |
| JP | 2004-111181 A | 4/2004 |
| JP | 2006-96622 A | 4/2006 |
| JP | 2006-269332 A | 10/2006 |

* cited by examiner

*Primary Examiner* — Patrick Ryan
*Assistant Examiner* — Lucas J. O'Donnell
(74) *Attorney, Agent, or Firm* — Foley & Lardner LLP (57) ABSTRACT

A fuel cell system includes: a power generation stack (1) composed by stacking a plurality of fuel cells (10); and a hydrocarbon-oxidizing device (2) disposed on an upstream side of the power generation stack (1) in a fuel supply passage (8). The hydrocarbon-oxidizing device (2) directly and electrochemically oxidizes hydrocarbons with a carbon number of 2 or more, which are contained in fuel gas, or decomposes the hydrocarbons and electrochemically oxidizes carbon obtained by decomposing the hydrocarbons.

8 Claims, 4 Drawing Sheets

FUEL CELL SYSTEM AND CONTROL METHOD THEREOF

TECHNICAL FIELD

The present invention relates to a fuel cell system that generates electric power by using, as fuel gas, hydrocarbon fuel such as town gas, natural gas, gasoline and light oil as it is, or reformed gas of the hydrocarbon fuel according to needs. More specifically, the present invention relates to a fuel cell system that inhibits carbon deposition on a fuel electrode of a fuel cell stack even if hydrocarbons with a carbon number of 2 or more are contained in the fuel gas supplied to the fuel electrode, thus making it possible to prevent a decrease of electrode performance, and relates to a control method of the fuel cell system.

BACKGROUND ART

In a fuel cell that generates electric power by using hydrocarbon fuel as it is, and in a fuel cell that generates the electric power by using reformed gas of the hydrocarbon fuel, a variety of fuel gases are used. Specifically, town gas, natural gas, gasoline, light oil and the like are used as the fuel gases. Among them, in such reformed fuel obtained by reforming the fuel such as the gasoline and the light oil once, and in the fuel such as the town gas, while large amounts of methane ($CH_4$) and hydrogen ($H_2$) are basically contained, small amounts of hydrocarbons with a carbon number of 2 or more, that is, ethane ($C_2H_6$), propane ($C_3H_8$), butane ($C_4H_{10}$), and the like are also contained.

For example, like a solid oxide fuel cell (SOFC), a fuel cell that operates at a somewhat high temperature is capable of generating the electric power even by using $CH_4$. However, in the case of using hydrocarbon fuel with the carbon number of 2 or more in the solid oxide fuel cell, it has happened that carbon (C) is deposited on a surface of an electrode catalyst, whereby electrode activity is decreased. Specifically, when the number of moles of steam contained in the fuel gas supplied to a fuel electrode is not significantly large with respect to the number of moles of the carbon, it becomes impossible to completely oxidize the fuel. More specifically, in the case of using $C_3H_8$ as the fuel, when a ratio (S/C) of the steam and the carbon is not equal to 2 or more, it becomes impossible to completely oxidize $C_3H_8$. Therefore, it has happed that the carbon is deposited on the surface of the electrode catalyst, whereby the electrode catalyst is decreased.

In this connection, as a technology for preventing such the carbon deposition, a technology disclosed in Japanese Patent Unexamined Publication No. 2003-86225 is proposed. In this conventional technology, a steam supply device is disposed, the steam is supplied to the fuel electrode, a steam reforming reaction is caused, and the hydrocarbon is decomposed to carbon monoxide (CO) and the hydrogen ($H_2$).

DISCLOSURE OF INVENTION

However, in this conventional technology, for the steam supply device, a water tank for supplying water thereto and a vaporizer for converting the water into the steam become necessary. Accordingly, enlargement and complication of the system are inevitable. Moreover, when the steam is supplied excessively, steam oxidation of the electrode is caused, and accordingly, it is also necessary to consider a control of a supplied amount of the steam. If a control device for the supplied amount of the steam as described above is added, then the system becomes more complicated. Moreover, in consideration for mounting the fuel cell system as described above on an automobile, it is concluded that a system free from the necessity to supply the water is desirable.

The present invention has been made in consideration for the above-described problems inherent in the fuel cell system using the fuel gas containing the hydrocarbons with the carbon number of 2 or more. It is an object of the present invention to provide a fuel cell system that does not require complicated devices and management, and is capable of preventing the carbon deposition onto the fuel electrode and maintaining fuel performance for a long time even if the hydrocarbons with the carbon number of 2 or more are contained in the fuel gas. Further, it is an object of the present invention to provide a control method of the fuel cell system concerned.

According to one aspect of the present invention, there is provided a fuel cell system including: a power generation stack composed by stacking a plurality of fuel cells; and a hydrocarbon-oxidizing device disposed on an upstream side of the power generation stack in a fuel supply passage, the hydrocarbon-oxidizing device directly and electrochemically oxidizing hydrocarbons with a carbon number of 2 or more, which are contained in fuel gas, or decomposing the hydrocarbons and electrochemically oxidizing carbon obtained by decomposing the hydrocarbons.

BEST MODE FOR CARRYING OUT THE INVENTION

A description will be made below specifically and in detail of a fuel cell system of the present invention and a control method of the fuel cell system concerned.

Figure 1:
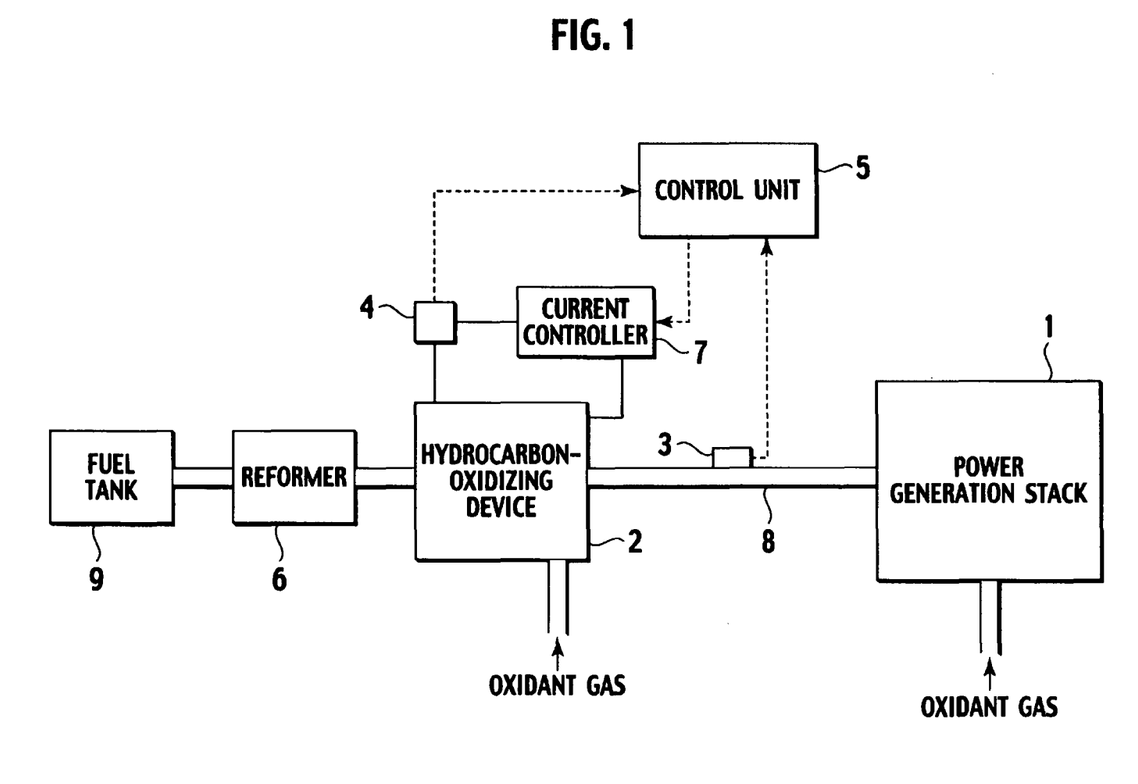
FIG. 1 is a schematic view showing a fuel cell system according to an embodiment of the present invention.

FIG. 1 shows an embodiment of the fuel cell system according to the present invention. As shown in FIG. 1, the fuel cell system of the present invention includes: a power generation stack 1 composed of a plurality of fuel cells; and a hydrocarbon-oxidizing device 2 disposed on an upstream side of the power generation stack 1 on a fuel supply passage 8. Moreover, the fuel cell system includes a gas concentration measurement instrument 3 as means for measuring concentrations of hydrocarbons with a carbon number of 2 or more. Here, the hydrocarbons are contained in fuel gas on an outlet side of the hydrocarbon-oxidizing device 2, that is, fuel gas supplied to the power generation stack 1. Measurement data of the gas concentration measurement instrument 3 is inputted to a control unit 5. Furthermore, the fuel cell system includes: a current controller 7 that controls a value of a current to the hydrocarbon-oxidizing device 2; and an ammeter 4 that detects such a current value.

Note that, in the fuel cell system shown in FIG. 1, an example is shown, where the raw fuel is supplied from a fuel tank 9 to a reformer 6, the raw fuel is reformed to reformed gas containing hydrogen by the reformer 6, and the reformed gas is then supplied to the hydrocarbon-oxidizing device 2. However, it is also possible to introduce the raw fuel as it is into the hydrocarbon-oxidizing device 2 depending on a type of the raw fuel, and the reformer 6 is not necessarily required. Specifically, for example, in the case of using town gas, it is frequent that the town gas is directly introduced into the fuel cells. However, in the case of using fuel, such as gasoline, containing hydrocarbon with a carbon number of approximately 8 as a main component, a reformer in accordance with a partial reforming method that does not require water and a steam reforming method in which a steam/carbon ratio (S/C) is small is used. In such a way, a simple system can be constructed, and is advantageously mounted on an automobile.

Besides the town gas, natural gas, the gasoline and light oil, as the fuel gas for use in the fuel cell system of the present invention, alcohol fuel, kerosene and the like can be used. However, in the case of using the alcohol fuel, the natural gas and the kerosene, it is desirable to dispose the reformer 6 upstream of the hydrocarbon-oxidizing device 2 in a similar way to the case of the gasoline.

Figure 2:
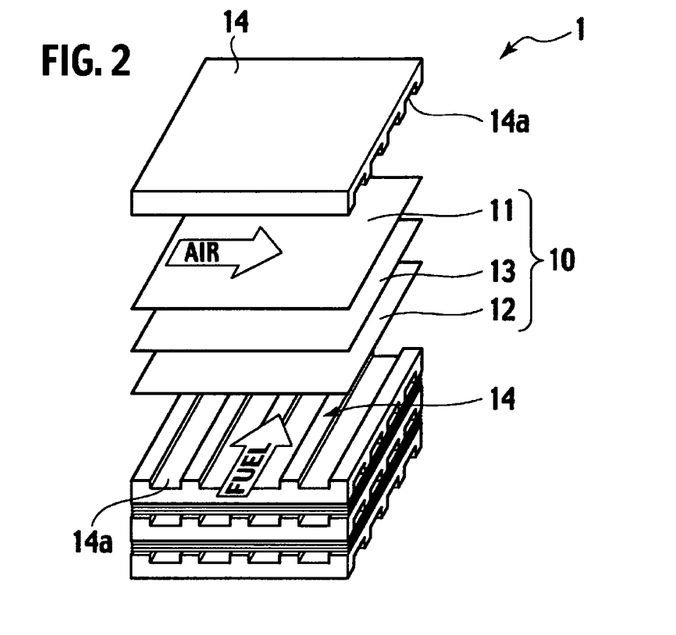
FIG. 2 is a partially exploded perspective view showing a power generation stack in the fuel cell system according to an embodiment of the present invention.

For the power generation stack 1, a stack including one or more cell elements 10 can be used. Here, each of the cell elements 10 serves as the fuel cell, and the cell element 10 is composed of a fuel electrode 11, an air electrode 12 and an electrolyte 13. As shown in FIG. 2, a stack in which the plurality of cell elements 10 are stacked while interposing electron-conductive separators 14 therebetween can be used. On the electron-conductive separators 14, gas flow grooves 14a are provided. As the power generation stack 1, a solid oxide fuel cell (SOFC) can be used. It is desirable that an operation temperature thereof be 300 degrees Celsius or higher, and the solid oxide fuel cell can be employed as a type of a fuel cell that satisfies this temperature condition. In such a way, the power generation stack 1 becomes capable of generating electric power even if $CH_4$ and CO are present in the fuel supplied thereto.

The hydrocarbon-oxidizing device 2 is a device that has a function to preferentially decompose and oxidize the hydrocarbons with the carbon number of 2 or more in the fuel gas (reformed gas) that passes therethrough. The hydrocarbon-oxidizing device 2 removes the hydrocarbons with the carbon number of 2 or more, which are contained in the raw fuel, by an electrochemical reaction.

In the present invention, it is desirable that the hydrocarbon-oxidizing device 2 include an oxygen-ion-conducting material. In such a way, even if carbon is deposited in the hydrocarbon-oxidizing device 2, the carbon is oxidized instantaneously by oxygen ions. Alternatively, the hydrocarbons with the carbon number of 2 or more are directly oxidized and decomposed by the oxygen ions. Specifically, the hydrocarbons with the carbon number of 2 or more, which are contained in the fuel, are removed by the oxygen ions, and a reaction at this time progresses in the following manner, for example, in the case where the hydrocarbons are propane ($C_3H_8$). Specifically, as represented in Chemical equation 1, first, the propane is thermally decomposed into carbon and hydrogen by a thermal decomposition reaction, and thereafter, the carbon is oxidized by the oxygen ions, and is converted into carbon dioxide. Alternatively, as represented in Chemical equation 2, the propane is directly oxidized by the oxygen ions, and is decomposed into carbon dioxide and water.

$$C_3H_8 \rightarrow 3C+4H_2$$

$$C+2O^{2-} \rightarrow CO_2 \qquad \text{[Chem.1]}$$

$$C_3H_8+10O^{2-} \rightarrow 3CO_2+4H_2O \qquad \text{[Chem.2]}$$

The oxygen-ion-conducting material is not particularly limited, and does not have to be a perfect oxygen ion conductor. The oxygen-ion-conducting material may be a material that also has electron conductivity when an oxygen partial pressure is low, for example, ceria ($CeO_2$) and a substitution of ceria such as ((CeSm)O). Alternatively, the oxygen-ion-conducting material may be a material that is a perfect oxygen ion conductor, for example, such as yttria-doped zirconia (YSZ), scandium-stabilized zirconia (SSZ) and lanthanum gallate (lanthanum-strontium-gallate-magnesite: LSGM).

Figure 3:
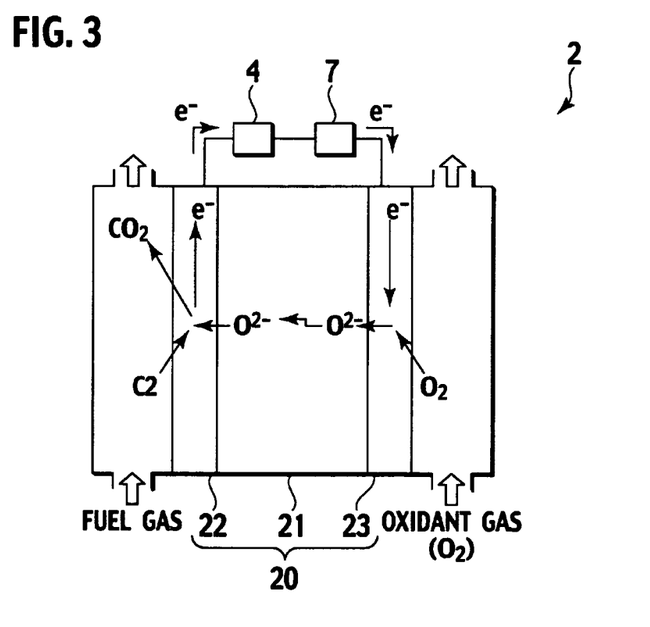
FIG. 3 is a schematic view showing a hydrocarbon-oxidizing device in the fuel cell system according to an embodiment of the present invention.

It is desirable that the above-described hydrocarbon-oxidizing device 2 be composed of a fuel electrode, an air electrode and an electrolyte, and be provided with a basic structure of the fuel cell. Specifically, as shown in FIG. 3, it is desirable that the hydrocarbon-oxidizing device 2 include an assembly 20, in which a fuel electrode 22 is provided on one surface of an electrolyte 21, and an air electrode 23 is provided on the other surface. With such a structure, oxygen serving as oxidant gas is reduced to oxygen ions in the air electrode 23, and the oxygen ions pass through the electrolyte 21 having an oxygen ion conducting function. Then, in the fuel electrode 22, hydrocarbon (C2) with the carbon number of 2 or more reacts with the oxygen ions ($O^{2-}$) which flow thereto through the electrolyte 21. In such a way, the hydrocarbon (C2) is oxidized.

Here, as a material of the air electrode 23, there can be mentioned: an electron- and oxygen-ion-conducting oxide such as LSM (LaSrMnO), SSC (SrSmCoO), and LSC (LaSrCoO); or a metal material such as Pt and Ag. Moreover, as a material of the fuel electrode 22, Ni-YSZ, Ni-SDC, Ni-SSZ and the like can be mentioned. Moreover, Ni-12CaO-7$Al_2O_3$ can be used as the material of the fuel electrode 22. This material is a substance containing a large amount of the oxygen ions, and accordingly, can efficiently oxidize and remove the carbon deposited on nickel. As a material of the electrolyte 21, yttria-stabilized zirconia (YSZ), samarium-doped ceria (SDC), scandium-stabilized zirconia (SSZ) and the like can be mentioned. However, the materials of the air electrode, the fuel electrode and the electrolyte are not particularly limited to those described above.

It is desirable that a hydrocarbon treatment catalyst be contained in the fuel electrode of the hydrocarbon-oxidizing device 2 together with the above-described oxygen-ion-conducting material. The hydrocarbon treatment catalyst decomposes and oxidizes the hydrocarbon with the carbon number of 2 or more as represented in the above-described Chemical equation 1, or directly oxidizes the hydrocarbon concerned as represented in the above-described Chemical equation 2. By the presence of the catalyst as described above, the hydrocarbons with the carbon number of 2 or more, which are contained in the fuel gas, are preferentially adsorbed to the fuel electrode described above, whereby the adsorbed hydrocarbons can be thermally decomposed, and can be directly subjected to an oxidation reaction. Therefore, even in a state where $CH_4$, $H_2$, CO and hydrocarbon gas with the carbon number of 2 or more are mixed together, the hydrocarbon gas with the carbon number of 2 or more, in which carbon-carbon bonding is present, is preferentially adsorbed, thermally decomposed and oxidized. Further, even if the carbon is deposited on the fuel electrode, the carbon is thermally decomposed and oxidized.

Note that the hydrocarbon treatment catalyst as described above can be said to be a material that easily adsorbs the hydrocarbons with the carbon number of 2 or more, which are contained in the fuel gas, and makes it easy to cause such a thermal decomposition reaction as represented in Chemical equation 1 and such a direct oxidation reaction as represented in Chemical equation 2. As the hydrocarbon treatment catalyst as described above, for example, there can be used nickel (Ni), cobalt (Co), palladium (Pd), platinum (Pt), rhodium (Rh) or iron (Fe), or an alloy containing at least one selected from these metals. However, in the case of using only Co as the hydrocarbon treatment catalyst, it is necessary to use, as the oxygen-ion-conducting material, a material such as the samarium-doped ceria (SDC) that combines the electron conductivity. Moreover, in the case where the hydrocarbon-oxidizing device 2 has a similar structure to that of the solid oxide fuel cell, it is the most preferable to use Ni as the hydrocarbon treatment catalyst.

With regard to a particle diameter of the hydrocarbon treatment catalyst, it is the most desirable to form the hydrocarbon treatment catalyst into microparticles, and particularly, into ultramicroparticles in a nanometer order. It is preferable that the ultramicroparticle catalyst as described above be adhered onto a surface of the oxygen-ion-conducting material in a highly dispersed state. Specifically, in the case where the particle diameter of the hydrocarbon treatment catalyst is in the nanometer order, the hydrocarbon treatment catalyst can adsorb a large amount of the hydrocarbons with the carbon number of 2 or more, and the oxygen-ion-conducting material is present on the periphery of the nanometer catalyst particles, thus making it possible to efficiently remove the hydrocarbons concerned. More specifically, it is preferable that the particle diameter (median diameter: D50) of the catalyst concerned be 1 nm to 10 nm since the catalyst can exert thermal decomposition/oxidation power thereof to a full extent in this case.

Meanwhile, the oxygen-ion-conducting material may be the perfect oxygen ion conductor as described above, or a mixed conducting material that conducts both of electrons and the oxygen ions. Specifically, if the oxygen-ion-conducting material basically has high oxygen ion conductivity, then the oxygen-ion-conducting material can quickly remove the hydrocarbons contained in the fuel and adsorbed to the surface of the catalyst. However, since the electron conductivity is also required for the fuel electrode, it is preferable that the catalyst material be basically a metal material or a material having the electron conductivity. In the case where a material that has no electron conductivity is used as the catalyst material, the perfect oxygen-ion-conducting material cannot be used, and it is essential to use the mixed conducting material for the electrons and the oxygen ions.

Figure 4:
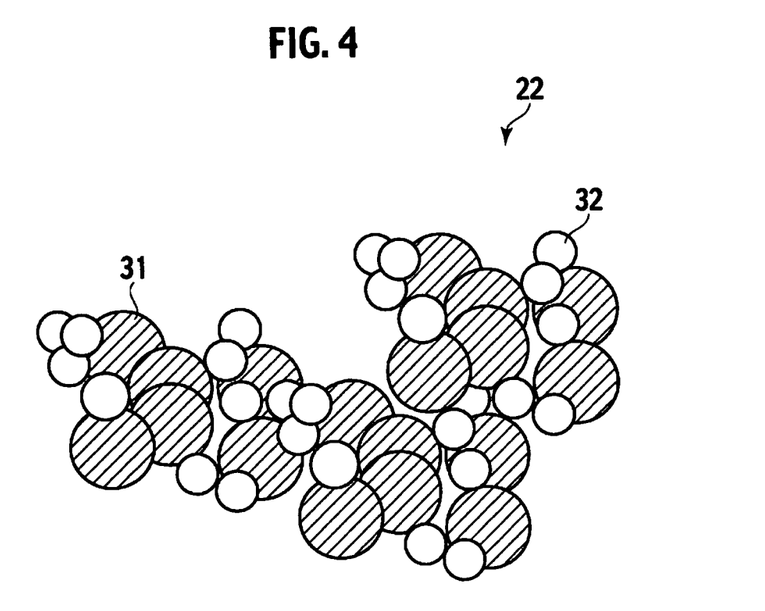
FIG. 4 is a schematic view showing a fuel electrode of the hydrocarbon-oxidizing device in the fuel cell system according to an embodiment of the present invention.

It is desirable that a total content of the oxygen-ion-conducting material contained in the fuel electrode be larger than a total content of the hydrocarbon treatment catalyst that coexists therewith. Note that the "content" mentioned here stands for a volume. Specifically, by the fact that the oxygen-ion-conducting material is contained in the fuel electrode more than the hydrocarbon treatment catalyst is, a probability that the oxygen-ion-conducting material may be present on the periphery of the catalyst is increased. Accordingly, even if the carbon is generated on the catalyst in such a manner that the hydrocarbons with the carbon number of 2 or more, which are contained in the fuel, are thermally decomposed, the carbon is quickly oxidized electrochemically by the oxygen ions which come flowing close thereto, thus making it possible to remove the carbon. FIG. 4 schematically shows an example of a structure of the fuel electrode 22. As shown in FIG. 4, in the fuel electrode 22 for use in the present invention, desirably, the content of the oxygen-ion-conducting material 31 is larger than the content of the hydrocarbon treatment catalyst 32, and moreover, the hydrocarbon treatment catalyst 32 is formed into the ultramicroparticles in the nanometer order, and the ultramicroparticles of the hydrocarbon treatment catalyst 32 are dispersed and supported on the peripheries of particles of the oxygen-ion-conducting material 31. With such a structure, the hydrocarbons with the carbon number of 2 or more, which are contained in the fuel, are selectively adsorbed to the hydrocarbon treatment catalyst 32, and thereafter, the hydrocarbons are oxidized quickly by the oxygen ions conducted by the particles of the oxygen-ion-conducting material 31, which are present numerously in the vicinities of the particles of the catalyst 32. Moreover, even if the carbon is deposited on the fuel electrode 22, the carbon on the surface of the fuel electrode is oxidized quickly by the oxygen ions conducted efficiently since the content of the oxygen-ion-conducting material 31 is large.

Moreover, in addition to the above-described oxygen-ion-conducting material and hydrocarbon treatment catalyst, desirably, an electron-conducting material is further contained in the fuel electrode of the hydrocarbon-oxidizing device 2. Specifically, in the case where the electron conductivity cannot be obtained or the obtained electron conductivity is insufficient only with the above-described hydrocarbon treatment catalyst and oxygen-ion-conducting material, it is desirable to add a material having the electron conductivity to the fuel electrode. However, desirably, the electron-conducting material in this case does not have power of the hydrocarbon treatment catalyst. Specifically, since it is desirable to set the content of the material having the power of the hydrocarbon treatment catalyst at a smaller amount than the content of the oxygen-ion-conducting material, it is preferable that the electron-conducting material be copper (Cu), in which catalytic activity for the hydrocarbons is low.

Note that, in a similar way to the power generation stack 1 shown in FIG. 2, the hydrocarbon-oxidizing device 2 of the present invention can be formed into a structure in which a plurality of the assemblies 20 are stacked. Here, in each of the assemblies 20, the fuel electrode 22 is provided on one surface of the electrolyte 21, and the air electrode 23 is provided on the other surface. Specifically, as the hydrocarbon-oxidizing device 2, a device can be used, in which the plurality of assemblies 20 are stacked while interposing therebetween electron-conductive separators having gas flowing grooves provided thereon.

In the fuel cell system of the present invention, from a viewpoint of an operation status of the hydrocarbon-oxidizing device 2 and appropriately control the system concerned, it is desirable to monitor a concentration of the hydrocarbons with the carbon number of 2 or more, which are contained in the fuel gas supplied from the hydrocarbon-oxidizing device 2 to the power generation stack 1. As shown in FIG. 1, in order to monitor the concentration of the hydrocarbons with the carbon number of 2 or more, desirably, the gas concentration measurement instrument 3 that measures the concentration of the hydrocarbons is provided on the fuel supply passage 8 on the outlet side of the hydrocarbon-oxidizing device 2. By the gas concentration measurement instrument 3, the operation status of the hydrocarbon-oxidizing device 2 can be controlled so that the content of the hydrocarbons with the carbon number of 2 or more, which are contained in the fuel gas discharged from the hydrocarbon-oxidizing device 2 to the power generation stack 1, cannot exceed a predetermined amount without fail. As a result, a decrease of power generation performance of the power generation stack 1, which may be caused by the carbon deposition, is prevented, thus making it possible to stably operate the fuel cell system for a long period.

Note that, with regard to the above-described predetermined amount regarding the content of the hydrocarbons with the carbon number of 2 or more, it is desirable to control a threshold value thereof at 0.1% by weight in a usual control. However, the following is confirmed. Specifically, in general, if the content of the hydrocarbons with the carbon number of 2 or more in the fuel gas discharged from the hydrocarbon-oxidizing device 2 and supplied to the power generation stack 1 is 0.5% by weight or less, then a cell deterioration owing to the carbon deposition does not occur even if the steam is a little.

As the above-described gas concentration measurement instrument 3, for example, an infrared sensor, a gas thermal conductivity sensor, a semiconductor sensor, a catalytic combustion sensor, and the like can be used. The infrared sensor is a sensor that measures a concentration of a gas component by using a phenomenon that, when infrared-range light is irradiated onto gas molecules of the hydrocarbons with the carbon number of 2 or more, only light with a specific wavelength intrinsic to a molecular structure of each of the hydrocarbons is absorbed. The gas thermal conductivity sensor is a sensor that measures a temperature change of a heating element, which is caused by a difference in gas thermal conductivity by using a difference in thermal conductivity between standard gas (air in usual) and the gas of the hydrocarbons with the carbon number of 2 or more. The semiconductor sensor is a sensor that measures electron conductivity change caused by the gas adsorption on a surface of a metal oxide semiconductor. The catalytic combustion sensor is a sensor that measures a temperature increase of a platinum wire coil, which is caused by catalytic combustion of the gas on a catalyst surface.

In the event of operating the fuel cell system of the present invention, the value of the current to the hydrocarbon-oxidizing device 2 is adjusted based on the concentration of the hydrocarbons with the carbon number of 2 or more on the outlet side of the hydrocarbon-oxidizing device 2, thus making it possible to control an amount of the oxygen ions flown to the fuel electrode 22 side. Specifically, the gas concentration measurement instrument 3 measures the concentration of the hydrocarbons with the carbon number of 2 or more, and sends a value of the measurement to the control unit 5. Thereafter, in the case of determining that the concentration of the hydrocarbons with the carbon number of 2 or more is larger than a prestored predetermined value, the control unit 5 outputs, to the current controller 7, a signal instructing an increase of the current to the hydrocarbon-oxidizing device 2. Then, the current controller 7 increases the value of the current flown to the hydrocarbon-oxidizing device 2, and allows a large amount of the oxygen ions to be supplied to the fuel electrode 22 side. In such a way, the concentration of the hydrocarbons with the carbon number of 2 or more can be reduced. Note that, in order to monitor the value of the current flown to the hydrocarbon-oxidizing device 2, as shown in FIG. 1, desirably, the ammeter 4 is disposed in advance between the current controller 7 and the hydrocarbon-oxidizing device 2, whereby the value of the current, which is detected by the ammeter 4, is adapted to be transmitted to the control unit 5.

Moreover, by performing the control as described above, the value of the current to the hydrocarbon-oxidizing device 2 is changed, and a generation amount of the steam as a product in the case of directly oxidizing the hydrocarbons is also changed. This steam is supplied to the power generation stack 1. In particular, since only a small amount of the steam is present on an upstream side in the inside of the fuel cell stack, the water generated in the hydrocarbon-oxidizing device 2 can be used as steam necessary for the internal reforming reaction of $CH_4$ and the shift reaction of CO. Moreover, an amount of the generated water can be controlled by adjusting the value of the current to the hydrocarbon-oxidizing device 2 in response to an amount of $H_2O$ required on the upstream in the inside of the fuel cell stack. Accordingly, the performance of the fuel cell system concerned is enhanced.

Figure 5:
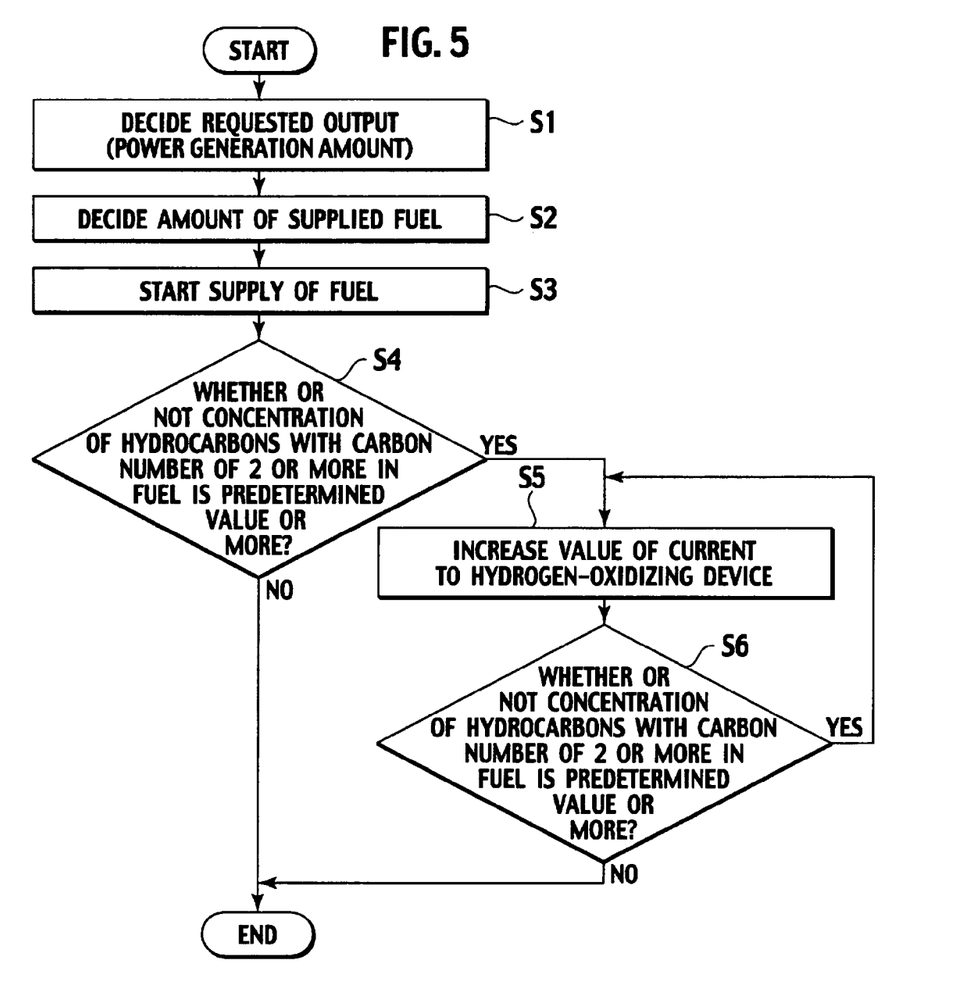
FIG. 5 is a flowchart showing a control method of the fuel cell system according to an embodiment of the present invention.

FIG. 5 is a flowchart explaining the control method of the fuel cell system of the present invention. In the fuel cell system of the present invention, first, when the operation of the system is started, an output requested to the fuel cell system is decided in Step S1. Thereafter, based on the requested output (requested power generation amount) thus decided, on correlation data between preinputted reforming conditions of the raw fuel and a composition of the generated gases, and on correlation data between the composition of the generated gases and the power generation amount, and on the like, the amount of the fuel supplied to the system is calculated in Step S2. Then, in Step S3, the supply of the fuel is started. When the supply of the fuel is started, the control proceeds to Step S4, where it is determined whether or not the concentration of the hydrocarbons with the carbon number of 2 or more, which are contained in the fuel gas supplied from the hydrocarbon-oxidizing device 2 to the power generation stack 1, is the predetermined concentration (for example, 0.1%) or more. Specifically, it is determined whether or not such a measurement value measured by the gas concentration measurement instrument 3 provided on the outlet side of the hydrocarbon-oxidizing device 2 is the predetermined value prestored in the control unit 5 or more. In the case where it has been determined in Step S4 that the concentration of the hydrocarbons with the carbon number of 2 or more is the predetermined value or more (YES), the control proceeds to Step S5, where the control unit 5 performs the control to increase the value of the current to the hydrocarbon-oxidizing device 2. Thereafter, the control proceeds to Step S6, where it is determined one more time whether or not the concentration of the hydrocarbons with the carbon number of 2 or more, which are contained in the fuel gas, is the predetermined concentration (for example, 0.1%) or more. In the case where the concentration has dropped down to lower than the predetermined value as a result that the increase of the current value in Step S5 functioned effectively, the control to reduce the concentration of the hydrocarbons with the carbon number of 2 or more is ended once. Then, after elapse of a predetermined time, the determination for the concentration of the hydrocarbons is started again and repeated. On the contrary, in the case where it has been determined in Step S6 that the concentration of the hydrocarbons with the carbon number of 2 or more is the predetermined value or more (YES), the value of the current to the hydrocarbon-oxidizing device 2 is further increased, whereby the concentration of the hydrocarbons with the carbon number of 2 or more is reduced.

As described above, in the present invention, the control is performed so that the concentration of the hydrocarbons with the carbon number of 2 or more, which are contained in the fuel gas supplied to the power generation stack 1, cannot exceed the predetermined value. Accordingly, the carbon is not deposited on the fuel electrode of the power generation stack 1, and the stable power generation performance can be maintained for a long period. Moreover, the composition of the gases ($CH_4$, $H_2$, CO, $CO_2$, $H_2O$) flown through the power generation stack 1 can be controlled accurately, and the performance of the entire system is enhanced. Furthermore, the steam generated in the hydrocarbon-oxidizing device 2 can be utilized effectively, and in particular, the power generation on the upstream side in the inside of the power generation stack at the time of activation is smoothened. In addition, the steam is not supplied excessively to the power generation stack 1, whereby steam oxidation of the fuel electrode becomes less likely to occur.

A description will be specifically made below of the present invention based on examples; the present invention is not limited to these examples at all.

EXAMPLE

As the power generation stack 1, the following stack was prepared and used. First, SOFC single cells 10 were prepared, each of which included: an air electrode 11 made of strontium-samarium-cobalt composite oxide (SSC); an electrolyte 13 made of 8-mol % yttrium-stabilized zirconia (8YSZ); and a fuel electrode 12 made of Ni-YSZ cermet in which a weight ratio of Ni and YSZ was 7:3. Next, the prepared SOFC single cells 10 were stacked in 30 stages while interposing a plurality of separators 14 therebetween. Meanwhile, as the hydrocarbon-oxidizing device 2, the following stack was prepared and used. First, in the same way as above, assemblies 20 were prepared, each of which included: an air electrode 23 made of the SSC; an electrolyte 21 made of the 8YSZ; and a fuel electrode 22 made of Ni-YSZ cermet in which the weight ratio of Ni and YSZ was 2:8. Next, the prepared assemblies 20 were stacked in five stages while interposing a plurality of separators therebetween. Here, in the fuel electrode 22, Ni corresponds to the hydrocarbon treatment catalyst 32, and YSZ corresponds to the oxygen-ion-conducting material 31. By using the power generation stack 1 and the hydrocarbon-oxidizing device 2, which are as described above, a fuel cell system as shown in FIG. 1 was fabricated.

Comparative Example

Figure 6:
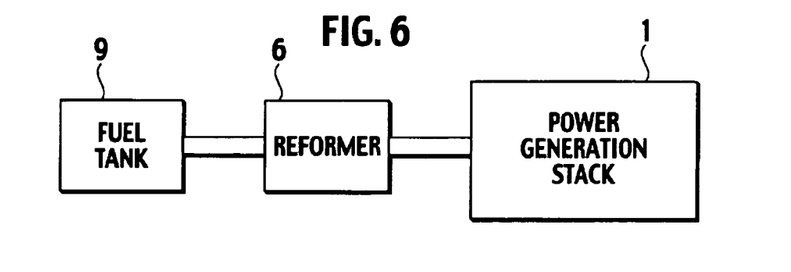
FIG. 6 is a schematic view showing a fuel cell system of a comparative example.

As shown in FIG. 6, a fuel cell system was fabricated, in which the hydrocarbon-oxidizing device was not disposed, a stack having a similar structure to that of the above-described Example was used as the power generation stack 1, and the fuel gas was adapted to be directly supplied to the power generation stack 1 from the reformer 6.

Performance Test

For the fuel cell systems of the above-described Example and Comparative example, performance tests were conducted by using isooctane as the raw fuel. Specifically, in each of Example and Comparative example, the content of the hydrocarbons with the carbon number of 2 or more in the fuel gas supplied to the power generation stack 1 when a power generation temperature of the power generation stack 1 and the hydrocarbon-oxidizing device 2 was set at 600 degrees Celsius was investigated. Moreover, a durability test (SOFC voltage: 0.8V) of 200 hours was implemented, and output decrease rates of the power generation stacks 1 after elapse of 200 hours in both of Example and Comparative example were compared with each other. The isooctane supplied as the raw fuel to these systems was first reformed partially at a temperature of 400 degrees Celsius in the reformers 6. A component composition of the fuel gas after being reformed became as shown in Table 1.

TABLE 1

| Raw fuel | Gas composition after reformation (% by weight) | | | | |
| --- | --- | --- | --- | --- | --- |
| | $H_2$ | CO | $CH_4$ | $CO_2$ | $C_3H_8$ |
| Isooctane | 53 | 42 | 2 | 2 | 1 |

Hence, in the system of Comparative example, in which the hydrocarbon-oxidizing device 2 was not provided, the reformed gas with the above-described composition was supplied as the fuel gas to the power generation stack 1. As opposed to this, in the fuel cell system of the present invention, the above-described reformed gas passed through the hydrocarbon-oxidizing device 2, whereby $C_3H_8$ in the reformed gas was decomposed and oxidized, and the concentration thereof was reduced from 1% by weight to 0.01% by weight. Such reduction of the concentration was sensed by the gas concentration measurement instrument 3. As a result, it was confirmed that fuel gas in which a content (concentration) of $C_3H_8$ was 0.01% by weight can be supplied to the power generation stack 1.

Next, for the fuel cell systems of the above-described Example and Comparative example, the durability tests of 200 hours were conducted, and the output decrease rates of the power generation stacks 1 after the durability tests were investigated. Results are as follows. In the system of Comparative example, which generated the electric power by the fuel gas containing 1% by weight of $C_3H_8$, an output decrease of 30% was observed. As opposed to this, in the fuel cell system of the present invention, which was adapted to generate the electric power by using the fuel gas in which the content of $C_3H_8$ was reduced to 0.01% by weight by disposing the hydrocarbon-oxidizing device 2 between the reformer 6 and the power generation stack 1, the output decrease was hardly observed, and it was confirmed that the output decrease rate was substantially 0%.

The entire content of a Japanese Patent Application No. P2007-141986 with a filing date of May 29, 2007 is herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

INDUSTRIAL APPLICABILITY

In accordance with the present invention, on the upstream side in the fuel supply passage to the power generation stack composed of the plurality of fuel cells, the hydrocarbon-oxidizing device is provided. The hydrocarbon-oxidizing device oxidizes the hydrocarbons with the carbon number of 2 or more, which are contained in the fuel gas, by the electrochemical reaction. Accordingly, even if the hydrocarbons with the carbon number of 2 or more are flown into the fuel cell system, the hydrocarbons are removed by the hydrocarbon-oxidizing device. Therefore, the deterioration of the fuel cell performance is prevented, thus making it possible to enhance the stability (durability) in the power generation. Moreover, since the oxidation reaction in the hydrocarbon-oxidizing device is followed by the electrochemical reaction (power generation), the output of the entire fuel cell system is enhanced.

The invention claimed is:

1. A fuel cell system, comprising:
a power generation stack comprising a plurality of fuel cells;
a hydrocarbon-oxidizing device disposed on an upstream side of the power generation stack in a fuel supply passage, and comprising an assembly, in which a fuel electrode is provided on one surface of an electrolyte, and an air electrode is provided on the other surface thereof, wherein the fuel electrode of the hydrocarbon-oxidizing device directly and electrochemically oxidizes hydrocarbons with a carbon number of 2 or more, which are contained in fuel gas, or decomposes the hydrocarbons and electrochemically oxidizes carbon obtained by decomposing the hydrocarbons;
a gas concentration measurement instrument provided on an outlet side of the hydrocarbon-oxidizing device, the gas concentration measurement instrument configured to measure a concentration of the hydrocarbons with the carbon number of 2 or more, which are contained in the fuel gas supplied to the power generation stack; and
a current controller programmed to increase a value of a current flow to the assembly in order to increase oxygen ions from the air electrode to the fuel electrode,
wherein when the concentration of the hydrocarbons with the carbon number of 2 or more measured by the gas concentration measurement instrument is larger than a predetermined value, the current controller increases the value of the current flown to the assembly.

2. The fuel cell system according to claim 1,
wherein an operation temperature of the power generation stack is 300 degrees Celsius or higher.

3. The fuel cell system according to claim 1,
wherein the hydrocarbon-oxidizing device comprises an oxygen-ion-conducting material.

4. The fuel cell system according to claim 1,
wherein the fuel electrode comprises:
a hydrocarbon treatment catalyst that oxidizes the hydrocarbons with the carbon number of 2 or more, or decomposes and oxidizes the hydrocarbons with the carbon number of 2 or more; and
an oxygen-ion-conducting material.

5. The fuel cell system according to claim 4,
wherein a total volume of the oxygen-ion-conducting material in the fuel electrode is larger than a total volume of the hydrocarbon treatment catalyst in the fuel electrode.

6. The fuel cell system according to claim 4,
wherein the hydrocarbon treatment catalyst is a metal selected from the group consisting of Ni, Co, Pd, Pt, Rh and Fe, or is an alloy containing at least one metal selected from the group consisting of Ni, Co, Pd, Pt, Ru, Rh and Fe.

7. The fuel cell system according to claim 1,
wherein the fuel electrode comprises:
a hydrocarbon treatment catalyst that oxidizes the hydrocarbons with the carbon number of 2 or more, or decomposes and oxidizes the hydrocarbons with the carbon number of 2 or more;
an oxygen-ion-conducting material; and
an electron-conducting material.

8. A control method of the fuel cell system according to claim 1, the method comprising:
measuring the concentration of the hydrocarbons with the carbon number of 2 or more on the outlet side of the hydrocarbon-oxidizing device; and
increasing a current value to the assembly when the concentration of the hydrocarbons with the carbon number of 2 or more is a predetermined value or more, and reducing the concentration of the hydrocarbons with the carbon number of 2 or more, which are discharged from the hydrocarbon-oxidizing device.

* * * * *